(12) United States Patent
Lange et al.

(10) Patent No.: US 6,717,662 B2
(45) Date of Patent: Apr. 6, 2004

(54) ARRANGEMENT FOR DETERMINING THE POSITION OF A LIGHT SOURCE

(75) Inventors: Guenther Lange, Egmating (DE); Rolf Rieger, Ebersberg (DE)

(73) Assignee: EADS Deutschland GmbH, Ottobrunn (DE)

( * ) Notice: Subject to any disclaimer, the term of this patent is extended or adjusted under 35 U.S.C. 154(b) by 0 days.

(21) Appl. No.: 09/983,094

(22) Filed: Oct. 23, 2001

(65) Prior Publication Data

US 2002/0048017 A1 Apr. 25, 2002

(30) Foreign Application Priority Data

Oct. 23, 2000 (DE) .......................................... 100 52 424

(51) Int. Cl.$^7$ .................................................. G01J 1/00
(52) U.S. Cl. .................. 356/121; 356/318; 356/139.03; 250/231 R
(58) Field of Search ................................ 356/121, 123, 356/139.01, 139.03, 139.05, 141.4, 141.5, 614, 638, 318; 250/216, 237 R, 203.4, 203.6, 231 R

(56) References Cited

U.S. PATENT DOCUMENTS

| | | | | |
|---|---|---|---|---|
| 3,951,550 A | * | 4/1976 | Slick ........................ 356/141.5 |
| 4,777,360 A | * | 10/1988 | Carner, Jr. ............... 250/231 R |
| 4,794,245 A | * | 12/1988 | Auer ....................... 250/203 R |
| 4,999,483 A | * | 3/1991 | Okamoto .................. 250/203.1 |
| 5,245,264 A | | 9/1993 | Helgren et al. ......... 318/568.22 |
| 5,264,910 A | * | 11/1993 | Hill ........................ 356/141.5 |
| 5,483,060 A | * | 1/1996 | Sugiura et al. .......... 250/237 R |
| 5,499,098 A | * | 3/1996 | Ogawa ........................ 356/614 |
| 5,510,893 A | * | 4/1996 | Suzuki ................... 356/139.03 |
| 5,640,241 A | * | 6/1997 | Ogawa ........................ 356/614 |
| 6,141,104 A | * | 10/2000 | Schulz et al. ............... 356/614 |
| 6,274,862 B1 | * | 8/2001 | Rigger ....................... 250/216 |

FOREIGN PATENT DOCUMENTS

| | | | |
|---|---|---|---|
| DE | 4214136 | * | 11/1993 |
| JP | 61066117 | * | 4/1986 |

* cited by examiner

Primary Examiner—Frank G. Font
Assistant Examiner—Sang H. Nguyen
(74) Attorney, Agent, or Firm—Crowell & Moring LLP

(57) ABSTRACT

An arrangement for determining the position of a light source includes a light-sensitive detector device and an arrangement for casting a shadow onto part of the light of the light source shining onto the detector device. The shadowing arrangement is formed by at least one rotationally symmetrical body.

10 Claims, 1 Drawing Sheet

ARRANGEMENT FOR DETERMINING THE POSITION OF A LIGHT SOURCE

BACKGROUND OF THE INVENTION

This application claims the priority of German patent document 100 52 424.9, filed Oct. 23, 2000, the disclosure of which is expressly incorporated by reference herein.

The present invention relates to an arrangement for determining the position of a light source.

Many light source locating arrangements are known to the art. For example, German patent documents DE 42 14 136 discloses the use of a rectangular slit, through which the light from the light source shines onto a detector line. From the areas in which the light of the two legs of the slit shines onto the detector line the incidence angle of the light can be determined, and thus the position of the light source relative to the measurement arrangement. With such an arrangement biaxial measurements are possible. Similarly, Japanese patent document JP 6 106 6117 provides a two-dimensional detector array, with which light shining in through a single slit is recorded and from which also the incidence angle is determined. This arrangement enables only uniaxial measurements.

German patent document DE 198 38 460 on the other hand, shows the use of a shadow mask, which creates one or more light-shadow boundaries on a detector line or detector array, thus enabling uniaxial or biaxial measurements of the incidence angle of light.

U.S. Pat. No. 5,640,241 uses, among other things, a two-dimensional detector array, onto which light shines through a cross slit, permitting a biaxial measurement of the incident light.

In U.S. Pat. No. 5,499,098, the light from a light source shines onto detector lines or a detector array. The light source is partially shaded by an arrangement that is located in a plane in front of the respective detector and comprises a transparent film or a transparent plate, which in certain areas is equipped with a light blocking structure. The shadow of the structure is used to determine the incidence direction of the light.

The disadvantage of these known prior are devices is that the depiction of the arrangements that permit the incident light to penetrate to the detector elements and/or cast a shadow onto the detector devices are dependent upon the incidence angle of the impinging light. Especially in the case of relatively large incidence angle deviations between the normal line and the detector plane, this feature can lead to large distortions of the depiction, and thus to measurement inaccuracies.

BRIEF SUMMARY OF THE INVENTION

One object of the present invention, therefore, is to provide an arrangement for determining the position of an available light source that provides consistent measurement accuracy, independently of the incidence angle of the incident light.

This and other objects and advantages are achieved by the light source position determination arrangement according to the invention, which includes a light-sensitive detector device, together with an arrangement for shadowing a portion of the light from the light source shining onto the detector device, arranged in a plane that is spaced from the detector device. According to the invention, the shadowing arrangement is formed by at least one rotationally symmetrical body, so that the depiction of the body is independent from the incidence angle of the incident light.

The shadowing arrangement can have an essentially random diameter as long as a clear depiction is possible on the detector device within the desired angle ranges. Preferably however a body with a small diameter is used in order to enable as fine a resolution as possible, and to cover as large an angle range of the incidence angle as possible. In an advantageous embodiment, a wire or a similar body can be used to provide the shadow. In this case, it may be sufficient to design the detector device as a one-dimensional detector line for the one-dimensional, uniaxial determination of the incidence angle.

If biaxial measurement of the incidence angle of the light is desired, the shadowing arrangement must contain a two-dimensional expansion; in particular, it may be formed by rotationally symmetrical bodies arranged in a cross-shaped manner in the plane. Here as well, with basically any random diameter of the body, it may be preferred that the shadowing arrangement be formed by bodies with the smallest possible diameter (wires, for example), arranged in a cross-shaped manner in the plane. For biaxial measurement, the detector device has a two-dimensional detector array.

The above arrangements can be applied in a solar sensor used to determine the incidence angle of sunlight, such as the one used in aerospace technology, for determining the position of a spacecraft relative to the sun.

Other objects, advantages and novel features of the present invention will become apparent from the following detailed description of the invention when considered in conjunction with the accompanying drawings.

DETAILED DESCRIPTION OF THE DRAWINGS

Figure 1:
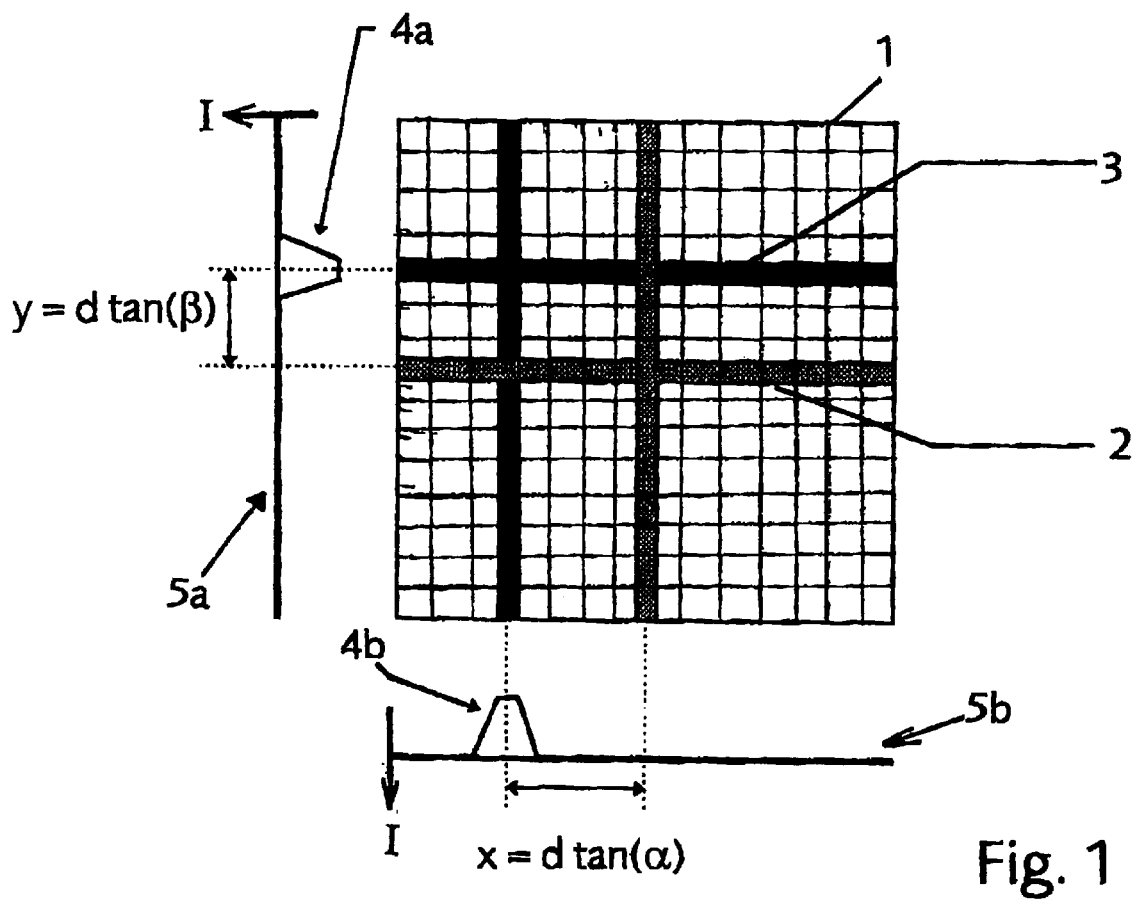
FIG. 1 shows a biaxial measuring arrangement according to the invention with cross wires for shadowing.

FIG. 1 shows a two-dimensional detector array 1, which can be realized, for example, through a CCD detector. In rows and columns, it measures the distribution 5$a$, 5$b$ of the intensity I of the incident light along the rows and columns of the detector array 1. The expansion of the individual detector elements, and thus the width of a detector row or column, have been indicated only diagrammatically and can be accordingly adjusted to the measurement accuracy requirements; in particular, it can be reduced in order to obtain a higher degree of measurement accuracy.

Wires 2, arranged crosswise to each other at a distance from a plane of the detector array 1, cause a shadow 3 to be cast onto the detector array. The wires 2 are, for example, arranged centrally to the rows or columns of the detector array 1; i.e., the point of intersection of the wires 2 is located at the center of the detector array 1. In accordance with the incidence angles α, β of the light relative to the normal line of the detector array 1 (see FIG. 2), the shadow 3 of the wires 2 is not cast centrally to the rows and columns of the detector array, but shifted accordingly. The location where the shadow 3 is cast onto the detector rows or columns is determined from the reduced intensity 4$a$, 4$b$ of the incident light that is measured there. From the deviation x, y of the shadow from the center of the detector line or slit and the known distance d between the plane 6 of the wires 2 and the detector array 1, the incidence angle α, β of the light in the line direction or column direction can be determined from $x = d \cdot \tan(\alpha)$ and $y = d \cdot \tan(\beta)$.

Figure 2:
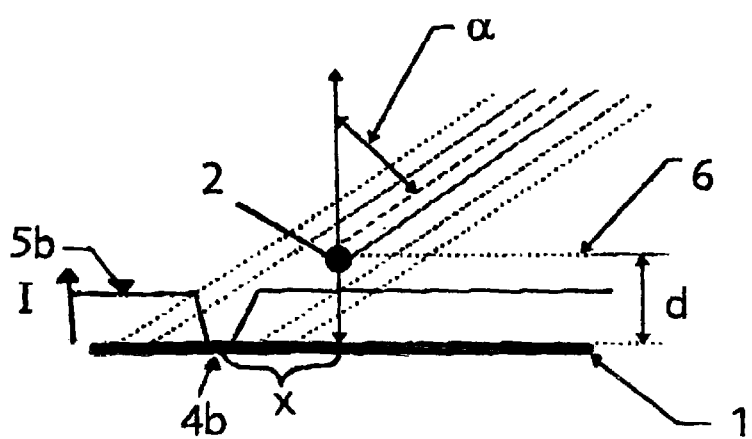
FIG. 2 is a side view of a uniaxial measuring arrangement.

FIG. 2 shows a side view of a uniaxial measurement arrangement, corresponding to a side view of FIG. 1 for one of the two wires 2. It shows a wire 2, which is arranged in a plane at the distance d from the detector device 1, and whose shadow is cast onto the detector device (detector line for purely uniaxial measurement, and a detector array for biaxial measurement). Along the detector device 1, at the point of impingement of the shadow 37 the distribution 5b of the intensity I of the incident light has a minimum 4b, which determines the length of the shadow 3 being cast. With above-described formula, the incidence angle can be determined from the distance d of the wire 2 from the detector device 1 and the deviation x of the cast shadow from the point of the vertical projection of the wire 2 onto the detector device 1.

Since the wires are rotationally symmetrical, no changes in the projection of the wire onto the detector device occur as long as the incident light is formed by sufficiently parallel beams. This is the case particularly when the incidence angle of sunlight is being determined, e.g. in solar sensors, whose area of application is the aerospace technology.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An arrangement for determining the position of a light source, comprising:

a light-sensitive detector device; and a shadowing arrangement for blocking a portion of light from the light source shining onto the detector device; wherein the light source is arranged in a first plane that is spaced from the detector device, the shadowing arrangement comprises a pair of elongate bodies, which are disposed in a second plane situated at a distance from the light sensitive detector, said elongate bodies having respective longitudinal axes which intersect with each other at an angle in said second plane, and each of said elongate bodies having a circular cross section in a plane perpendicular to the longitudinal axis thereof.

2. The arrangement according to claim 1, wherein the shadowing arrangement comprises a pair of wires.

3. The arrangement according to claim 1, wherein the detector device comprises a two-dimensional detector array.

4. A solar sensor for determining the incidence angle of sunlight, comprising:

a light-sensitive detector device; and a shadowing arrangement for blocking a portion of sunlight shining onto the detector device; wherein the shadowing arrangement comprises a pair of elongate bodies, which are disposed in a plane situated at a distance from the light sensitive detector, said elongate bodies having respective longitudinal axes which intersect with each other at an angle in said second plane, and each of said elongate bodies having a circular cross section in a plane perpendicular to the longitudinal axis thereof.

5. The arrangement according to claim 4, wherein the pair of elongate bodies comprises a pair of wires.

6. The arrangement according to claim 4, wherein the detector device comprises a two-dimensional detector array.

7. A method for determining the position of a light source, comprising:

providing a light sensitive detector device;

interposing a light blocking element between the light source and the light sensitive detector device, at a set distance from the detector device; and determining a location of a shadow cast on said light sensitive detector device by said light blocking element, based on signals output from said light sensitive detector device;

wherein the light blocking element comprises a pair of elongate bodies, which are disposed in a plane situated at a distance from the light sensitive detector, said elongate bodies having respective longitudinal axes which intersect with each other at an angle in said second plane, and each of said elongate bodies having a circular cross section in a lane perpendicular to the longitudinal axis thereof.

8. The method according to claim 6, wherein said pair of elongate bodies comprises a pair of wires.

9. The method according to claim 8, wherein:

said light sensitive detector device comprises a two dimensional planar array; and each wire of said pair of wires intersects with a central normal axis of the two dimensional planar array.

10. The method according to claim 9, wherein:

said wires intersect with each other at an angle of approximately 90°.

* * * * *